(12) United States Patent
Nishimoto

(10) Patent No.: US 6,507,539 B2
(45) Date of Patent: Jan. 14, 2003

(54) MAGNETO-OPTICAL RECORDING DEVICE HAVING OPTICAL HEAD AND MAGNETIC HEAD MOVING INDEPENDENTLY

(75) Inventor: Hideki Nishimoto, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 18 days.

(21) Appl. No.: 09/795,516

(22) Filed: Feb. 28, 2001

(65) Prior Publication Data

US 2001/0008503 A1 Jul. 19, 2001

Related U.S. Application Data

(63) Continuation of application No. PCT/JP99/00408, filed on Feb. 1, 1999.

(30) Foreign Application Priority Data

Sep. 11, 1998 (JP) .......................... 10-258824

(51) Int. Cl.$^7$ .............................. G11B 11/00
(52) U.S. Cl. .................. 369/13.12; 369/13.13; 369/75.2
(58) Field of Search ................ 369/13.12, 13.11, 369/13.2, 13.21, 77.2, 77.1, 75.2, 75.1

(56) References Cited

U.S. PATENT DOCUMENTS

| | | | | |
|---|---|---|---|---|
| 5,122,998 A | * | 6/1992 | Mizuno et al. ............ | 369/13 |
| 5,331,611 A | * | 7/1994 | Matsuba .................... | 369/13 |
| 5,594,708 A | * | 1/1997 | Chaya ....................... | 369/13 |
| 5,644,554 A | * | 7/1997 | Harada et al. ............. | 369/13 |
| 5,768,241 A | | 6/1998 | Kanazawa et al. ........ | 369/77.2 |
| 5,905,696 A | | 5/1999 | Kanazawa et al. ........ | 369/13 |
| 5,995,333 A | | 11/1999 | Kanazawa et al. ........ | 360/105 |
| 6,011,673 A | | 1/2000 | Kanazawa et al. ........ | 360/105 |

FOREIGN PATENT DOCUMENTS

| | | |
|---|---|---|
| JP | 61190727 | 8/1986 |
| JP | 63234431 | 9/1988 |
| JP | 2240878 | 9/1990 |
| JP | 4345942 | 12/1992 |
| JP | 5-12741 | 1/1993 |
| JP | 5-342506 | 12/1993 |
| JP | 5-342687 | 12/1993 |
| JP | 6-68539 | 3/1994 |
| JP | 7-210911 | 8/1995 |

* cited by examiner

Primary Examiner—Tan Dinh
(74) Attorney, Agent, or Firm—Greer, Burns & Crain, Ltd.

(57) ABSTRACT

An optical storage device adapted so that a cartridge accommodating an optical storage medium is inserted/ejected with respect to the device. The device includes a drive base, a cartridge holder mounted on the drive base for receiving the cartridge, a first carriage mounted on the drive base so as to be movable in a first direction, a first drive mechanism for moving the first carriage, and an optical head mounted on the first carriage. The device further includes a second carriage mounted on the cartridge holder so as to be movable in the first direction, a second drive mechanism for moving the second carriage, a magnetic head assembly mounted on the second carriage and having a magnetic head, and a holding mechanism for selectively holding the magnetic head in its lifted condition above the optical storage medium.

6 Claims, 24 Drawing Sheets

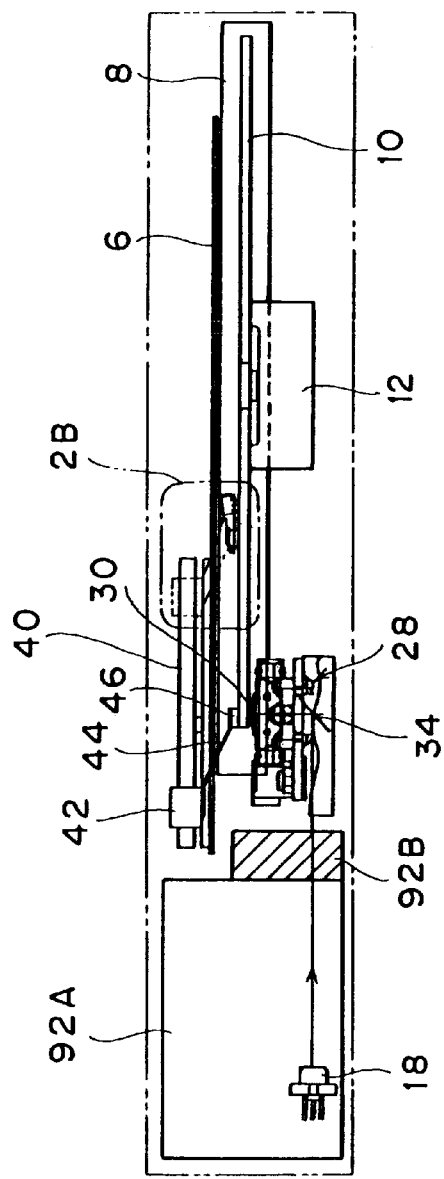
F I G. 2A
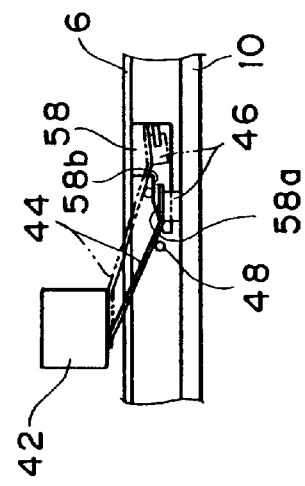
F I G. 2B

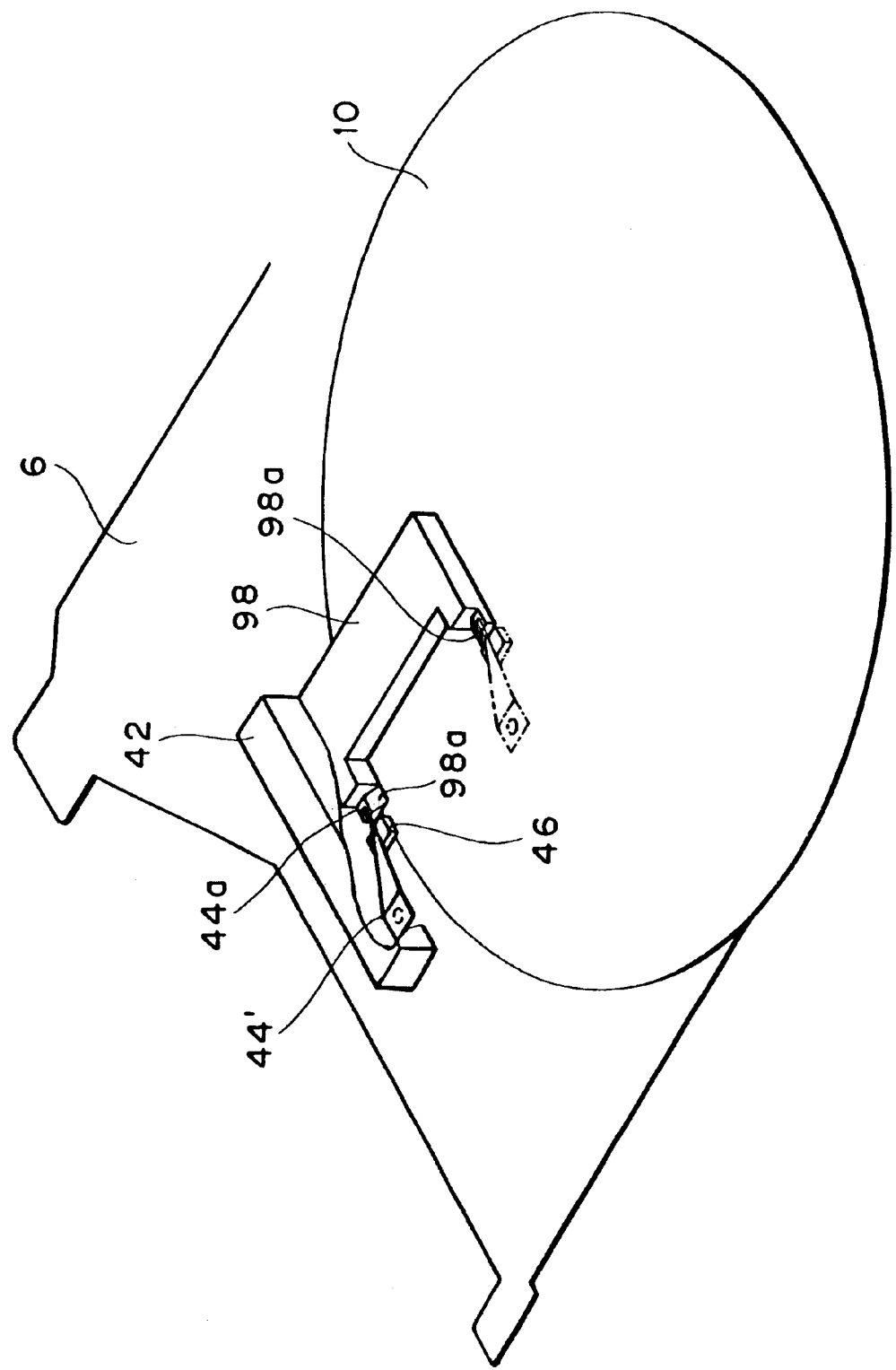

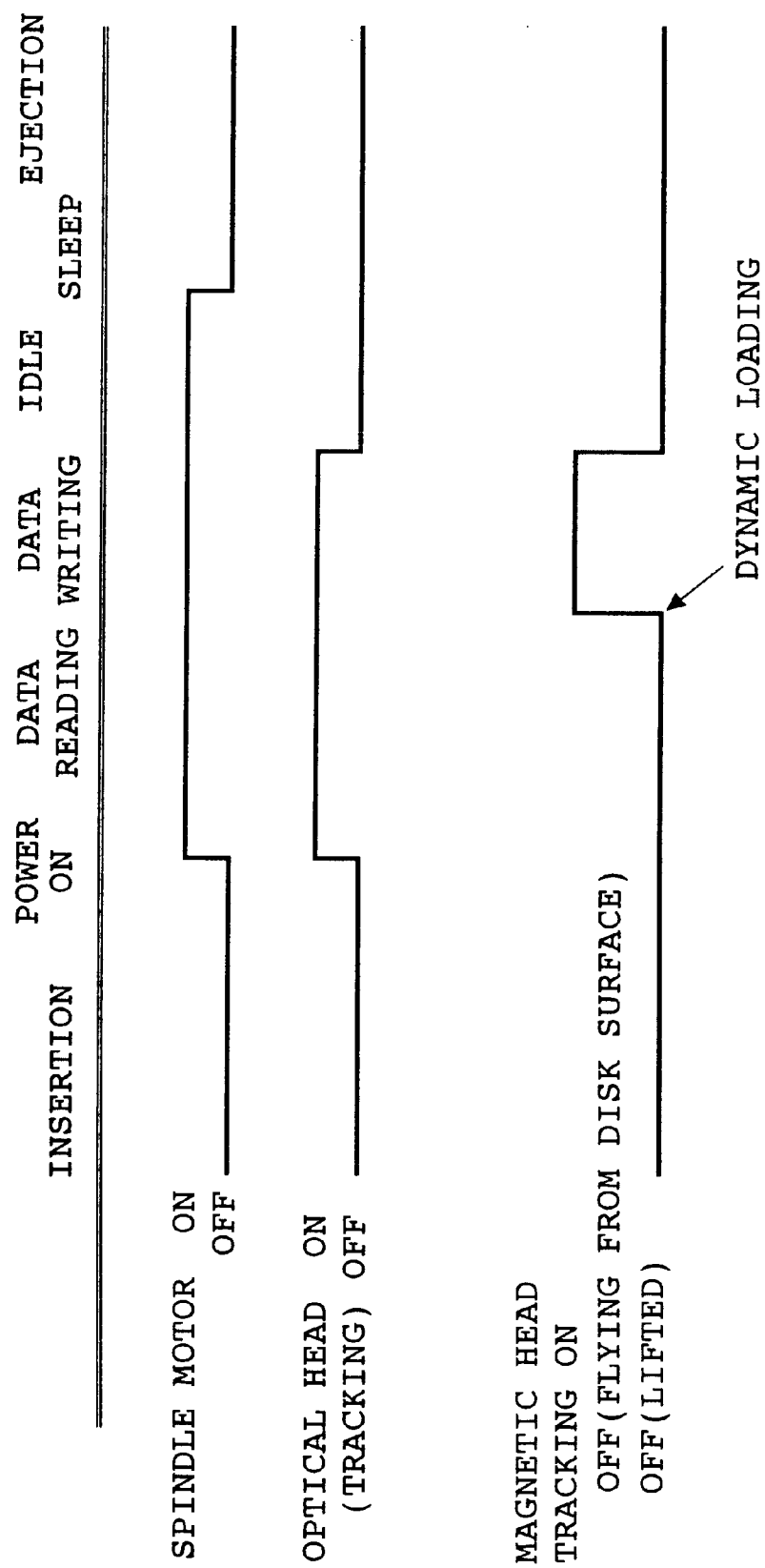

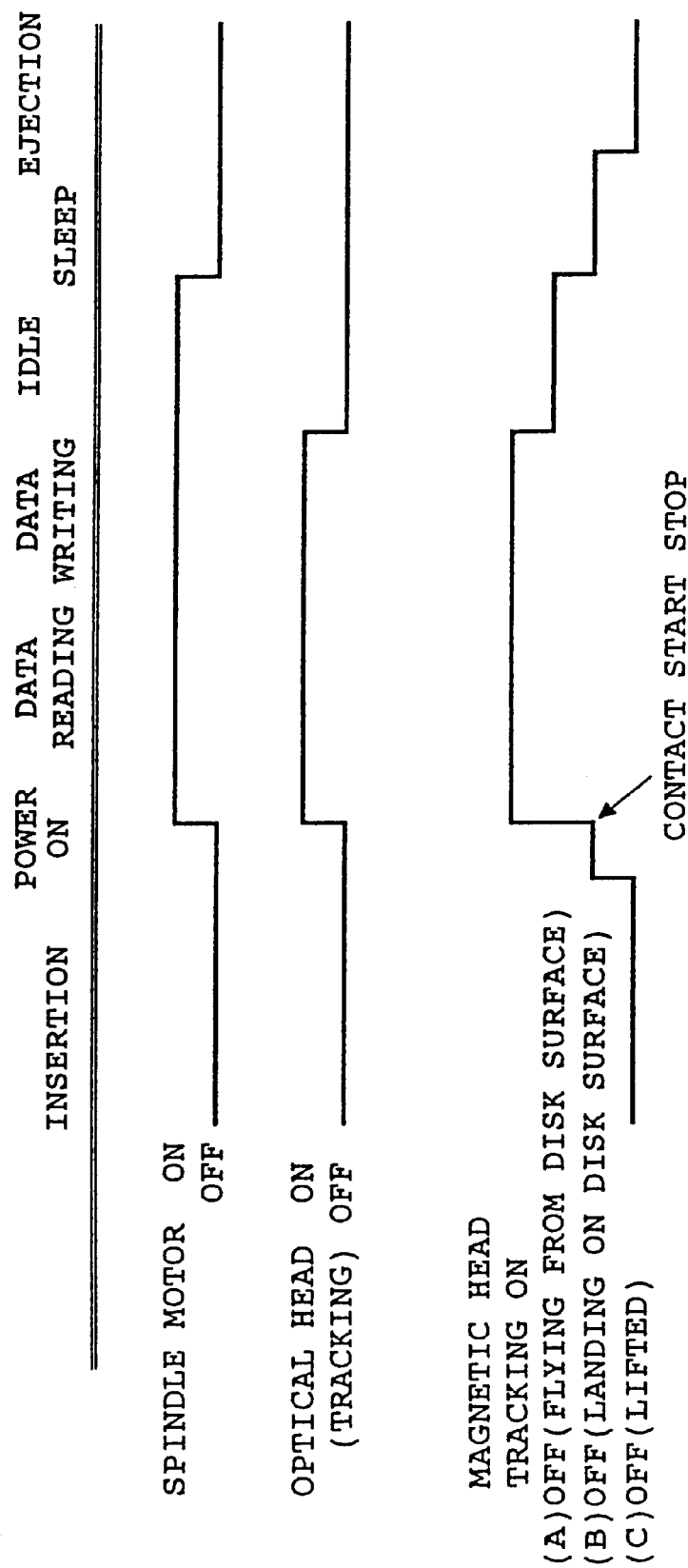

MAGNETO-OPTICAL RECORDING DEVICE HAVING OPTICAL HEAD AND MAGNETIC HEAD MOVING INDEPENDENTLY

This is a continuation of PCT/JP99/00408, filed Feb. 1, 1999.

BACKGROUND OF THE INVENTION

1. Field of the Invention

The present invention relates generally to an optical storage device, and more particularly to a magneto-optical disk drive having an optical head and a magnetic head.

2. Description of the Related Art

A magneto-optical disk drive is required to become higher in recording density year after year, and various methods have been developed for recording of information in a magneto-optical disk drive. According to an optical modulation method adopted by the ISO standard, a laser beam is modulated by data to be recorded as applying an external magnetic field in a fixed direction, thereby recording information on a magneto-optical recording medium. In this optical modulation method, a recording density of information is limited by the size of a beam spot.

In contrast, a magnetic field modulation method such that an external magnetic field is modulated by data to be recorded as directing a laser beam having a fixed intensity is considered to have an advantage in high-density recording over the optical modulation method, because a beam spot can be overlapped. The external magnetic field is modulated at a high speed by data to be recorded, and a contact type or flying type magnetic head is therefore used as the magnetic head. The shape and operation principle of the magnetic head in the magneto-optical disk drive are substantially the same as those of a magnetic head used in a magnetic disk drive or a magnetic tape drive. In the flying type, the magnetic head flies a height of about 10 $\mu$m above the magneto-optical disk being rotated, and records data in the beam spot. It is considered that there is a large chance of use of a magnetic head also in an optical modulation type magneto-optical disk drive with the advance of high-density recording and reproduction in the future.

The following problems are considered in using a magnetic head in a magneto-optical disk drive.

As a first problem, the magnetic head is difficult to handle as compared with an electromagnet bias used in a conventional optical modulation type magneto-optical disk drive, because the magnetic head flies a height of about 10 $\mu$m above the disk. In particular, it is greatly important to provide means for preventing breakage of the magnetic head due to the contact between the magnetic head and a portable disk or disk cartridge. Conventionally provided is means for lifting the magnetic head or means for retracting the magnetic head outside the disk to prevent the contact between the magnetic head and the disk cartridge in inserting/ejecting the disk cartridge into/from the disk drive. However, there is no special means for preventing breakage of the magnetic head when the disk cartridge is present in the disk drive.

A second problem is that the magnetic head is located opposite to the optical head with respect to the disk. In the conventional disk drive, the magnetic head and the optical head are fixed to the same carriage and moved together. Accordingly, a carriage portion for a magnetic head assembly including a load beam must be set longer than a data region of the disk. In the case of retracting the magnetic head outside the disk to prevent breakage of the magnetic head, the carriage must therefore be moved to a considerably deep position in the disk drive, so that an installation space for optical components in the disk drive is reduced. Accordingly, the disk drive as an optical storage device becomes large in size.

SUMMARY OF THE INVENTION

It is therefore an object of the present invention to provide an optical storage device having means for preventing breakage of a magnetic head when an optical storage medium is present in the device.

It is another object of the present invention to provide an optical storage device which can prevent a reduction in installation space for optical components due to the movement of a carriage.

In accordance with an aspect of the present invention, there is provided an optical storage device for making an access to an optical storage medium accommodated in a cartridge, including a drive base; a cartridge holder provided on the drive base for receiving the cartridge; a first carriage mounted on the drive base so as to be reciprocatable in a first direction; a first drive mechanism for moving the first carriage; an optical head mounted on the first carriage for directing light to a given position on the optical storage medium; a second carriage mounted on the cartridge holder so as to be reciprocatable in the first direction; a second drive mechanism mounted on the cartridge holder for moving the second carriage; and a magnetic head assembly mounted on the second carriage and having a magnetic head for applying a magnetic field to a given position on the optical storage medium.

The optical storage device further includes an unloading mechanism for holding the magnetic head in its lifted condition above the optical storage medium in reproducing data. Preferably, the magnetic head is lifted at a position outside of the optical storage medium or at an innermost circumferential portion of the medium.

The magnetic head assembly includes a support member fixed at a base end portion thereof to the second carriage and the magnetic head mounted on a front end portion of the support member. Preferably, the unloading mechanism includes a magnetic head lifter fixed to the cartridge holder and an engaging member fixed to the support member.

Alternatively, the unloading mechanism includes a magnetic head lifter fixed to the cartridge holder and the support member engaging the magnetic head lifter when the magnetic head is moved to an outermost circumferential portion of the optical storage medium.

In accordance with another aspect of the present invention, there is provided an optical storage device for making an access to an optical storage medium, including a drive base; a first carriage mounted on the drive base so as to be reciprocatable in a first direction; a first drive mechanism for moving the first carriage; an optical head mounted on the first carriage for directing light to a given position on the optical storage medium; a second carriage provided independently of the first carriage so as to be reciprocatable in the first direction; a second drive mechanism for moving the second carriage; and a magnetic head assembly mounted on the second carriage and having a magnetic head for applying a magnetic field to a given position on the optical storage medium; the stroke of movement of the magnetic head being longer than the stroke of movement of the optical head.

Preferably, the stroke of movement of the magnetic head is longer than the stroke of movement of the optical head on the inner circumferential side or outer circumferential side of the optical storage medium.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 2A is a schematic side view of FIG. 1;

FIG. 2B is an enlarged view of a portion 2B shown in FIG. 2A;

FIG. 22 is a schematic perspective view showing a magnetic head lifter in the fifth preferred embodiment;

FIG. 23 is a timing chart in the present invention; and

FIG. 24 is a timing chart in the prior art.

DETAILED DESCRIPTION OF THE PREFERRED EMBODIMENTS

Figure 1:
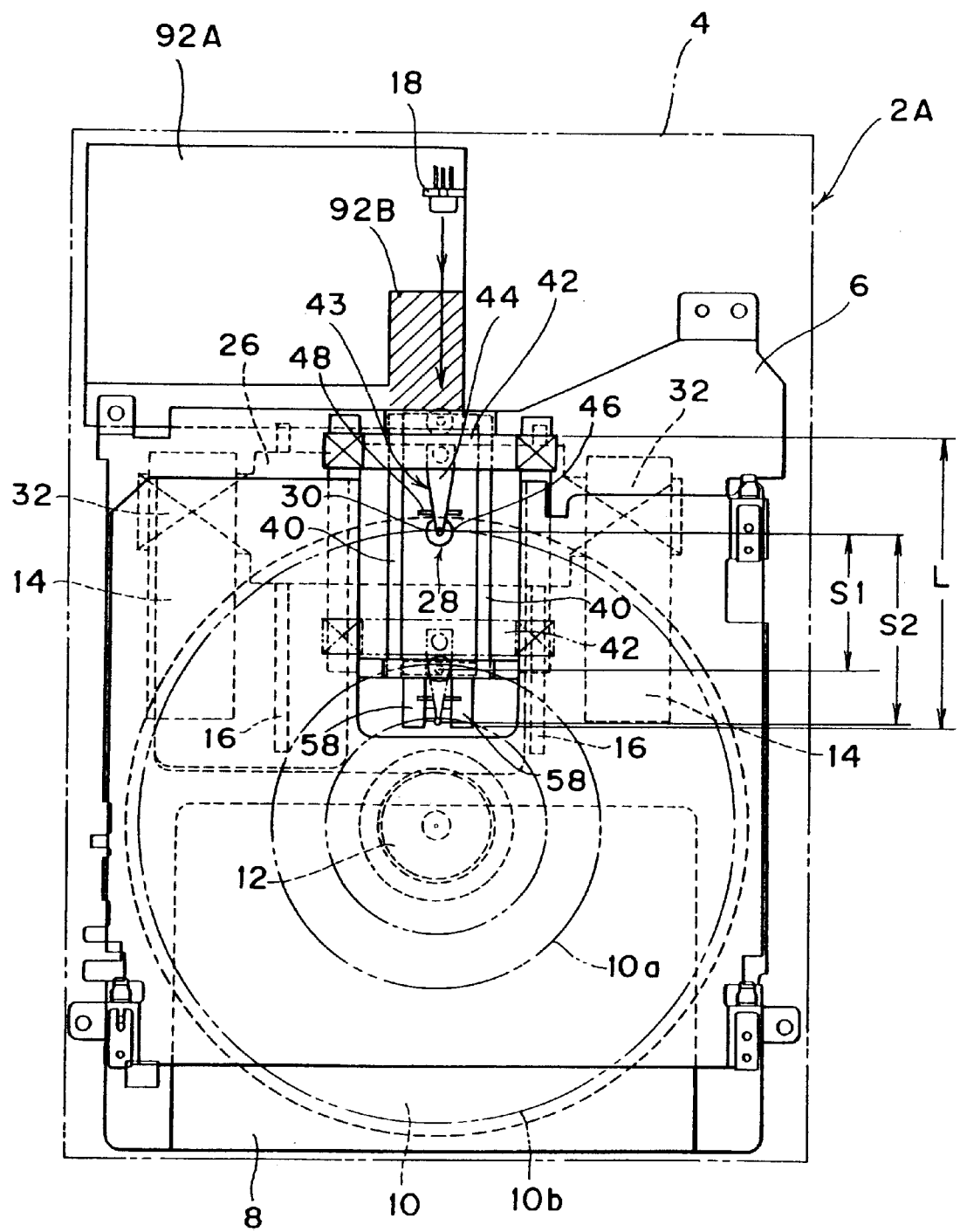
FIG. 1 is a schematic plan view of a magneto-optical disk drive according to a first preferred embodiment of the present invention.

Some preferred embodiments of the present invention will now be described with reference to the drawings. Throughout the drawings, substantially the same parts are denoted by the same reference numerals. Referring to FIG. 1, there is shown a schematic plan view of a magneto-optical disk drive 2A according to a first preferred embodiment of the present invention. FIG. 2A is a left side view of FIG. 1, and FIG. 3 is a rear elevation of FIG. 1.

A magneto-optical disk 10 is accommodated in a cartridge 8. Reference numeral 10a denotes an innermost track of the disk 10, and reference numeral 10b denotes an outermost track of the disk 10. A data region is defined between the innermost track 10a and the outermost track 10b. Reference numeral 4 denotes a drive base or disk enclosure of the magneto-optical disk drive 2A. A pair of magnetic circuits 14, a pair of guide rails 16, and a semiconductor laser 18 are mounted on the drive base 4.

Figure 3:
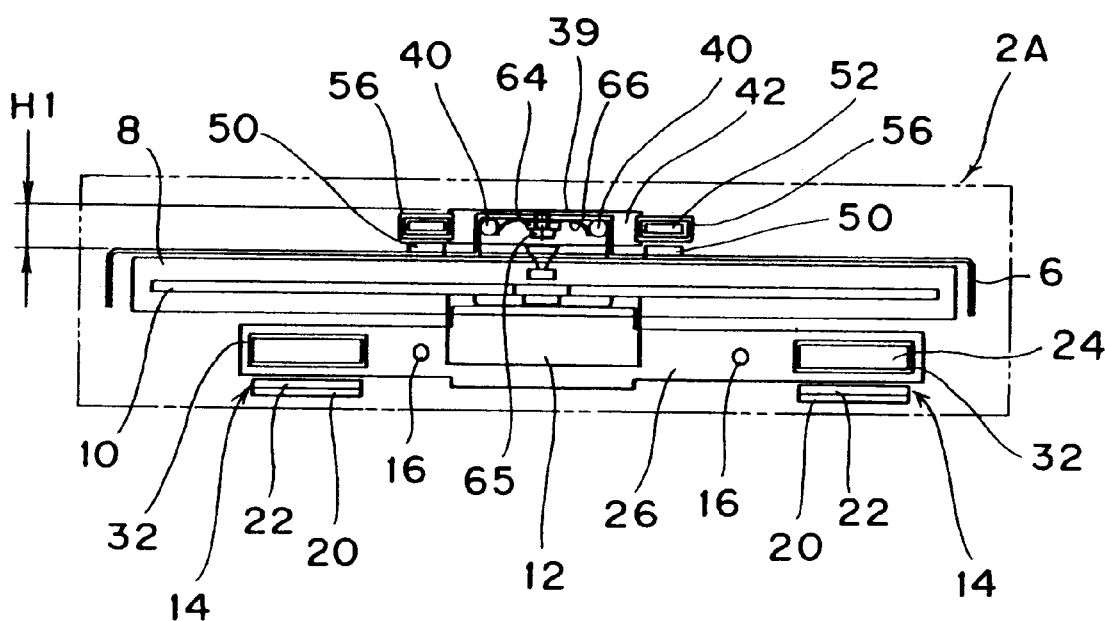
FIG. 3 is a schematic rear elevation of FIG. 1.

As shown in FIG. 3, each magnetic circuit 14 includes a back yoke 20 fixed to the drive base 4, a permanent magnet 22, and a top yoke 24. Reference numeral 26 denotes a first carriage for carrying an optical head 28 having an objective lens 30. The first carriage 26 is provided with a pair of coils 32 at positions corresponding to the pair of magnetic circuits 14. The magnetic circuits 14 and the coils 32 constitute a voice coil motor (VCM). By passing a current through the coils 32, the first carriage 26 is moved in the radial direction of the magneto-optical disk 10 as being guided by the pair of guide rails 16.

As shown in FIG. 2A, the optical head 28 has a beam raising mirror 34. A laser beam emitted from the semiconductor laser 18 is reflected at right angles by the beam raising mirror 34, and is then focused on the magneto-optical disk 10 by the objective lens 30. The magneto-optical disk cartridge 8 is inserted into a cartridge holder 6 fixed to the drive base 4 or ejected from the cartridge holder 6. The cartridge holder 6 is formed of a magnetic material such as iron.

Figure 4:
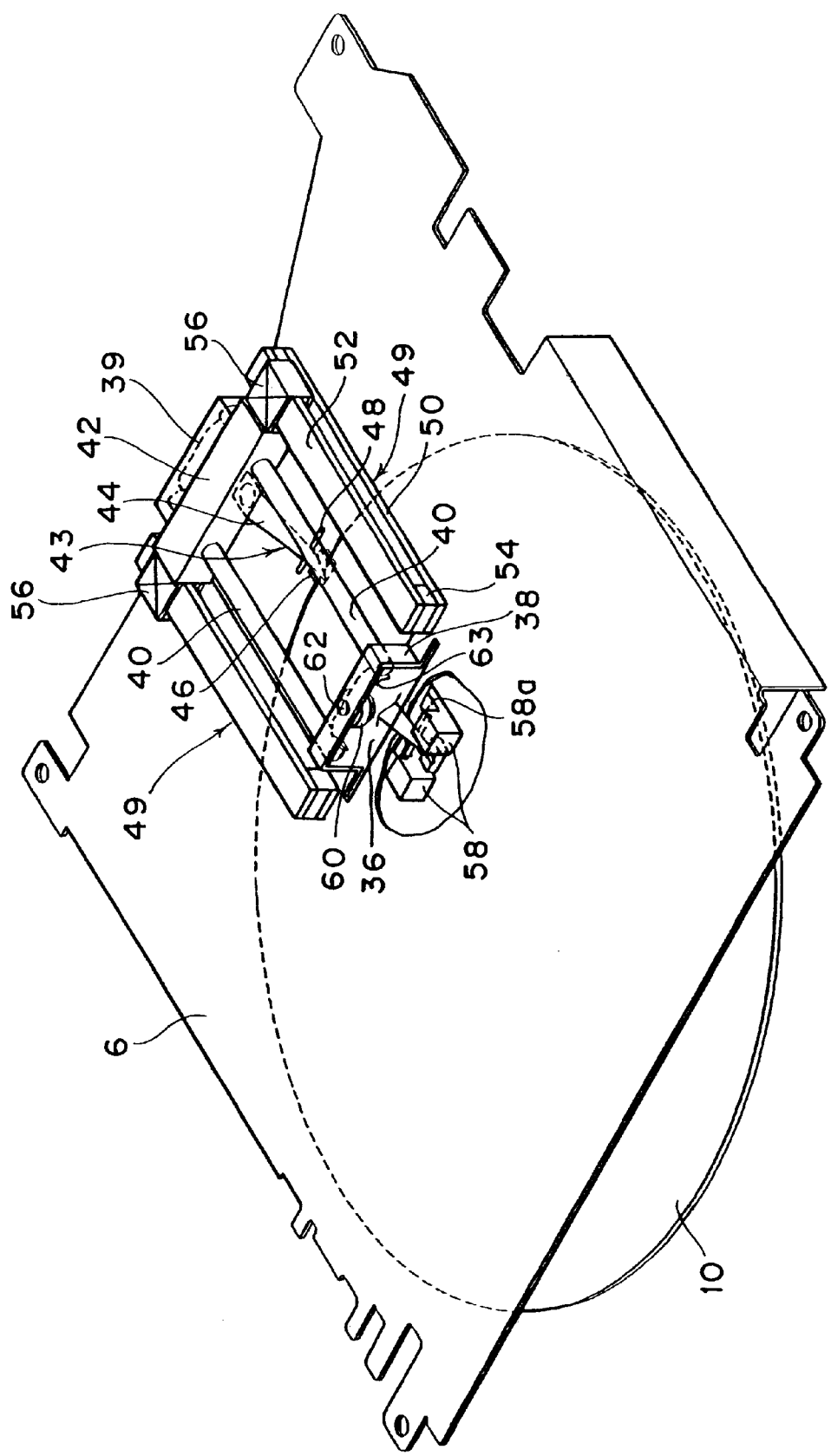
FIG. 4 is a perspective view of the first preferred embodiment, showing a drive mechanism for a magnetic head.
Figure 5:
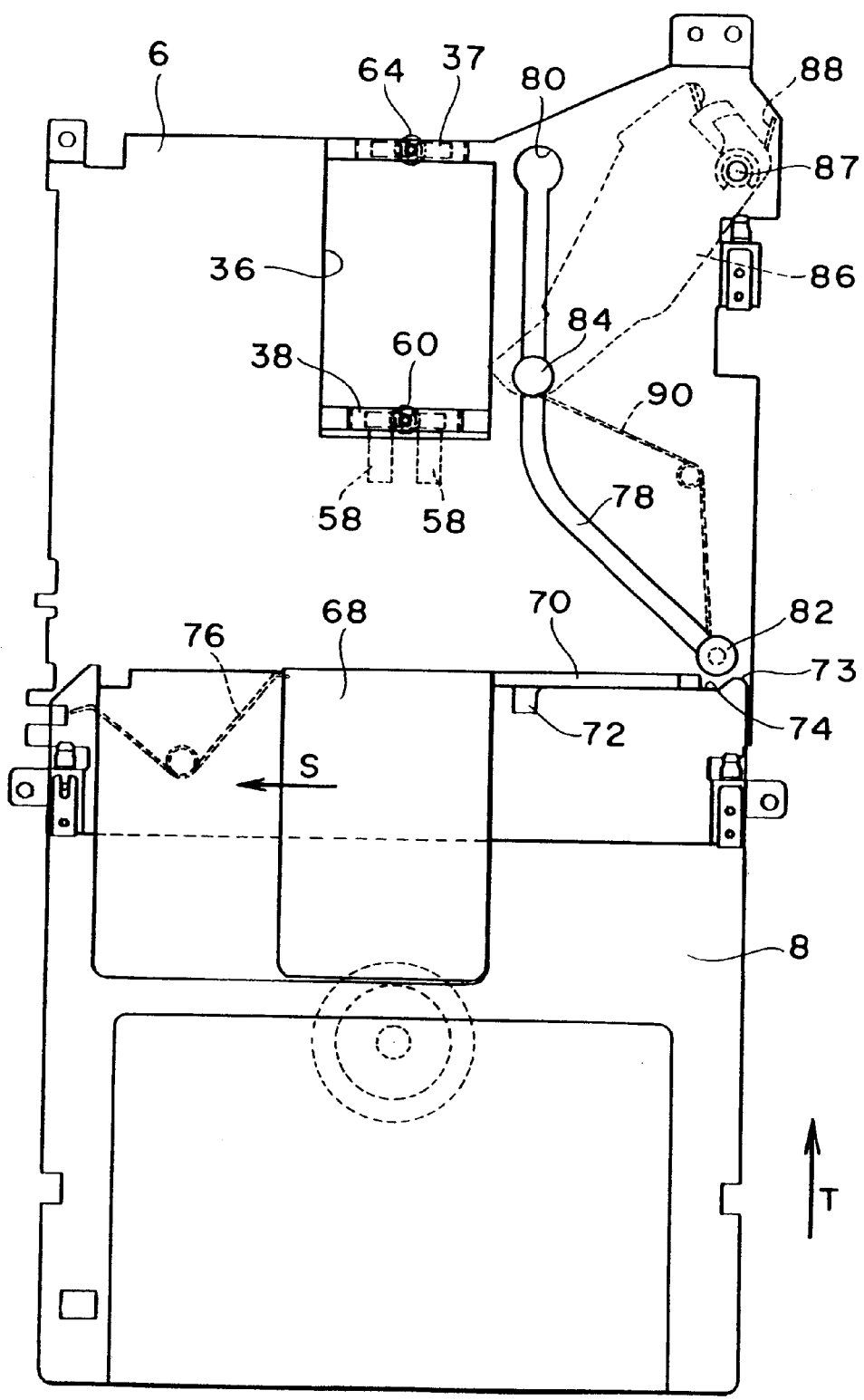
FIG. 5 is a plan view of a cartridge holder and a magneto-optical disk cartridge in the condition where the cartridge has just been inserted into the cartridge holder in the first preferred embodiment, showing a shutter opening/closing mechanism and a cartridge ejecting mechanism.
Figure 6:
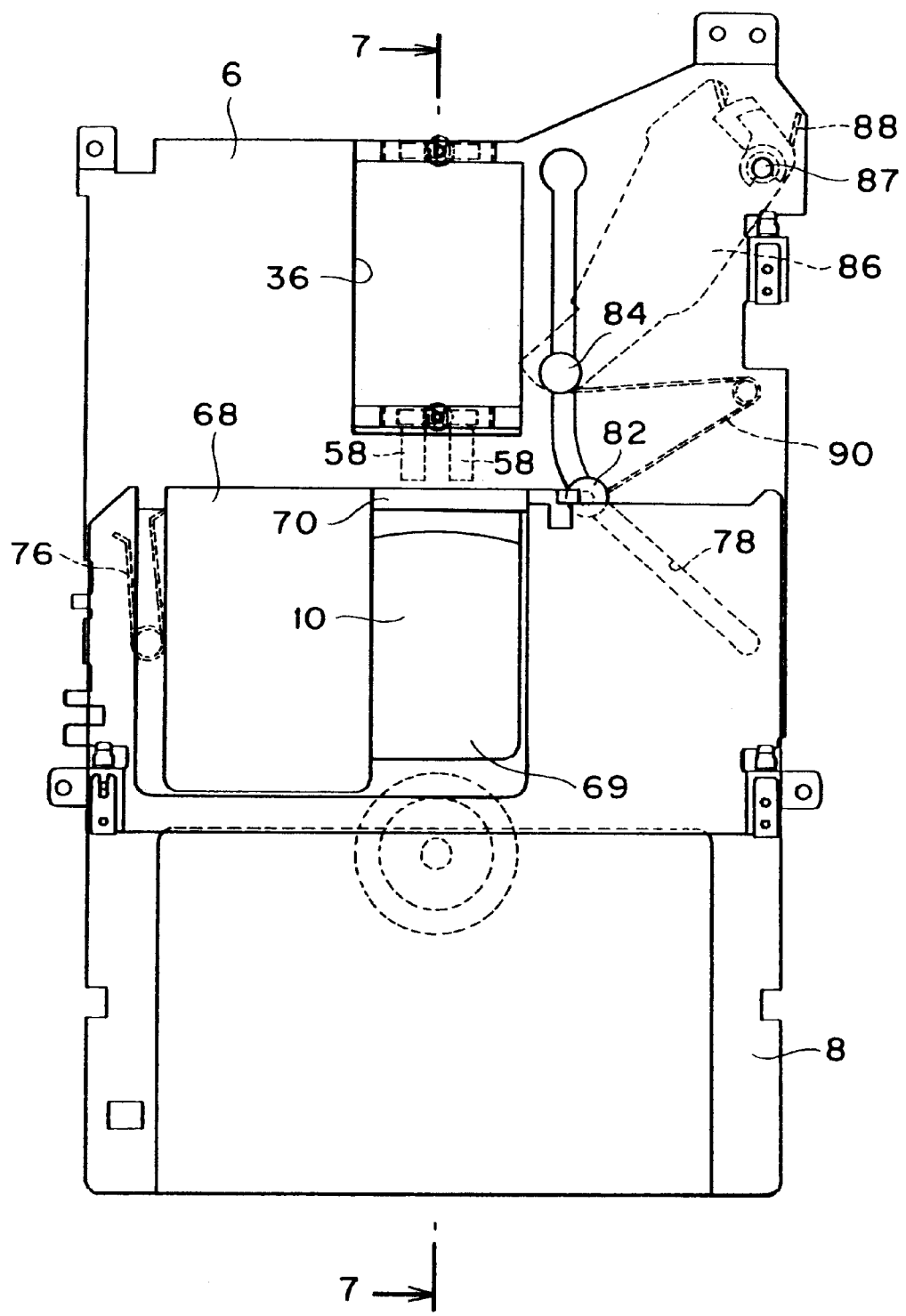
FIG. 6 is a plan view similar to FIG. 5, showing a condition where the cartridge is in the middle of insertion into the cartridge holder.

As shown in FIGS. 5 and 6, the cartridge holder 6 is formed with a rectangular opening 36. As shown in FIG. 4, the cartridge holder 6 is integrally formed with a pair of rail mounting members 38 and 39. The rail mounting members 38 and 39 are formed by extrusion, for example. A pair of guide rails 40 are fixed to the rail mounting members 38 and 39.

As best shown in FIG. 3, the guide rails 40 are retained by a leaf spring 66, and the leaf spring 66 and a stopper 64 are secured together to the rail mounting member 39 by a screw 65, thereby fixing one end portion of each guide rail 40 to the rail mounting member 39. Similarly, the guide rails 40 are retained at the other end portions by a leaf spring 63, and the leaf spring 63 and a stopper 60 are secured together to the rail mounting member 38 by a screw 62, thereby fixing the other end portion of each guide rail 40 to the rail mounting member 38.

Each guide rail 40 extends in the radial direction of the magneto-optical disk 10. A second carriage 42 is mounted on the guide rails 40 so as to be movable in the radial direction of the magneto-optical disk 10 as being guided by the guide rails 40. The direction of movement of the second carriage 42 is the same as that of the first carriage 26.

A magnetic head assembly 43 is mounted on the second carriage 42. More specifically, the magnetic head assembly 43 includes a load beam 44 having a base end portion fixed to the second carriage 42, and a magnetic head 46 mounted on a front end portion of the load beam 44. An engaging member 48 is fixed to the load beam 44. In this preferred embodiment, the load beam 44 extends in the same direction as that of each guide rail 40.

One feature of the present invention is that the optical head 28 and the magnetic head 46 are moved independently of each other. Accordingly, drive means for the second carriage 42 is provided independently of the drive means (VCM) for the first carriage 26. The drive means for the second carriage 42 is composed of a pair of magnetic circuits 49 fixed to the cartridge holder 6 and a pair of coils 56 mounted on the second carriage 42.

As mentioned above, the cartridge holder 6 is formed of a magnetic material such as iron, and a back yoke of each magnetic circuit 49 is formed by the cartridge holder 6. That is, each magnetic circuit 49 is composed of the cartridge holder 6 as a back yoke, a permanent magnet 50 fixed to the cartridge holder 6, a top yoke 52, and a side yoke 54. Each coil 56 is moved in a gap defined between the permanent magnet 50 and the top yoke 52 of the corresponding magnetic circuit 49.

As shown in FIG. 4 which is a partially-cutaway perspective view of the cartridge holder 6, a pair of magnetic head lifters 58 are fixed to the lower surface of the cartridge holder 6. Each magnetic head lifter 58 has an inclined surface (tapering surface) 58a on which the engaging member 48 is adapted to ride. As best shown in FIG. 2B, when the magnetic head 46 is moved to an innermost circumferential portion of the magneto-optical disk 10, the engaging member 48 fixed to the load beam 44 first rides on the inclined surface 58a of each magnetic head lifter 58 and subsequently rides on a horizontal surface 58b contiguous from the inclined surface 58a. Accordingly, the magnetic head 46 is held in the condition that it is separated from the upper surface of the magneto-optical disk 10 by the magnetic head lifters 58.

Referring to FIGS. 5 and 6, there are shown plan views of the cartridge holder 6 and the cartridge 8 with the other mechanisms shown in FIG. 1 being omitted. FIG. 5 shows a condition where the cartridge 8 has started to be inserted into the magneto-optical disk drive 2A, and FIG. 6 shows a condition where the cartridge 8 is in the middle of insertion into the magneto-optical disk drive 2A.

The cartridge 8 has a shutter 68 movable in a direction of arrow S shown in FIG. 5 and a shutter opening member 70 having one end fixed to the shutter 68. The cartridge 8 further has a shutter spring 76 having one end engaged with the shutter 68 and the other end engaged with a housing of the cartridge 8. The cartridge 8 is formed with a notch 72.

The magneto-optical disk cartridge 8 is inserted or loaded into the magneto-optical disk drive 2A in a direction of arrow T shown in FIG. 5. In association therewith, the shutter 68 is opened by the shutter opening member 70 to partially expose the magneto-optical disk 10 through a window 69. Accordingly, the magneto-optical disk drive 2A necessarily includes an opening mechanism for the shutter 68 and an ejecting mechanism for the cartridge 8. The opening mechanism for the shutter 68 and the ejecting mechanism for the cartridge 8 are not shown in FIG. 1.

As shown in FIGS. 5 and 6, the cartridge holder 6 is formed with a guide groove 78. The guide groove 78 has one end formed as a large-diameter end portion 80. Two rollers 82 and 84 are inserted from the large-diameter end portion 80 into the guide groove 78. An eject arm 86 is mounted on the cartridge holder 6 so as to be pivotable about a shaft 87. The eject arm 86 is biased by a torsion coil spring 88 in a counterclockwise direction as viewed in FIG. 5. The roller 84 is inserted also in an elongated hole (not shown) formed in the eject arm 86. Reference numeral 90 denotes a cartridge eject spring having one end fixed to the roller 82 and the other end fixed to the roller 84.

When the cartridge 8 is inserted into the magneto-optical disk drive 2A in the direction T as shown in FIG. 5, the roller 82 comes to engagement with a recess 74 defined between the other end of the shutter opening member 70 and a projection 73 of the cartridge 8. When the cartridge 8 is further inserted into the magneto-optical disk drive 2A, the roller 82 is pushed by the cartridge 8 to move in an obliquely extending portion of the guide groove 78 and simultaneously open the shutter 68 through the shutter opening member 70 in the direction S against a biasing force of the shutter spring 76. When the roller 82 reaches a longitudinally extending portion of the guide groove 78 continuing from the obliquely extending portion, the roller 82 comes to engagement with the notch 72 of the cartridge 8, thus fully opening the shutter 68.

Figure 7:
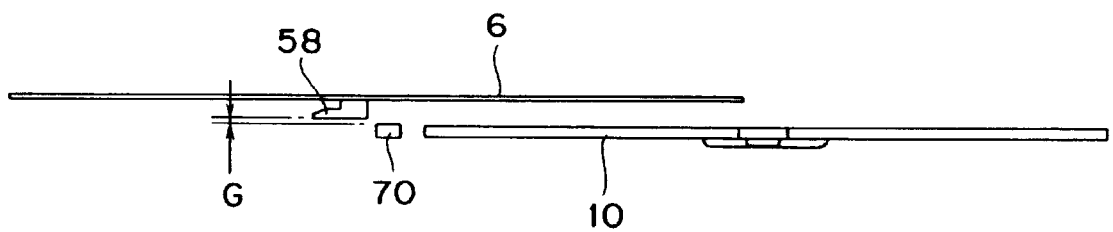
FIG. 7 is a cross section taken along the line 7—7 in FIG. 6.

As shown in FIG. 7, there is defined a gap G between each magnetic head lifter 58 fixed to the cartridge holder 6 and the shutter opening member 70 of the cartridge 8, so as to prevent interference of the cartridge 8 and the magnetic head lifters 58 during insertion of the cartridge 8 into the magneto-optical disk drive 2A.

When the cartridge 8 is further inserted from the condition shown in FIG. 6, the cartridge 8 urges the rollers 82 and 84 and the eject arm 86 to reach a fully inserted condition shown in FIG. 1. At this time, a lock mechanism (not shown) for a spindle motor 12 located below the cartridge 8 is unlocked to lift the spindle motor 12 and chuck the magneto-optical disk 10.

When the magneto-optical disk drive 2A is powered on, the spindle motor 12 is driven to rotate the disk 10. In recording information on the disk 10, the coils 56 are energized to move the second carriage 42 in the radially outward direction of the disk 10, thereby canceling the lifted condition of the magnetic head 46 established by the magnetic head lifters 58. Accordingly, the magnetic head 46 flies a given height above the disk 10 owing to an air flow generated by the rotation of the disk 10, thus obtaining a condition that information recording is allowed.

In recording information, both the semiconductor laser (LD) 18 and the magnetic head 46 are driven simultaneously. As best shown in FIG. 2A, the laser beam emitted from the semiconductor laser 18 is reflected at right angles by the beam raising mirror 34 and then focused onto the disk 10 by the objective lens 30.

At this time, an external magnetic field is applied by the magnetic head 46 magnetically modulated to form a recorded mark on the disk 10. In recording information, the coils 32 and the coils 56 are energized simultaneously to thereby simultaneously move the first carriage 26 and the second carriage 42 and control the seek operations of the optical head 28 and the magnetic head 46 to a target recording track of the disk 10.

In any operational condition other than in information recording, the magnetic head 46 is not used, and it is therefore held in the lifted condition above the disk 10 to prevent breakage of the magnetic head 46 and the disk 10 due to collision. That is, in inserting/ejecting the cartridge 8, in reproducing information, or during standby, the coils 56 are energized to move the second carriage 42 in the radially inward direction of the disk 10 until the engaging member 48 rides on the inclined surface 58a of each magnetic head lifter 58 and then comes to rest on the horizontal surface 58b of each magnetic head lifter 58, thereby retaining the magnetic head 46 in the lifted condition above the disk 10 by means of the magnetic head lifters 58. Accordingly, it is possible to prevent the magnetic head 46 and the disk 10 from being damaged by the collision therebetween due to an impact load or the like.

In ejecting the cartridge 8 from the magneto-optical disk drive 2A, the spindle motor 12 is lowered by a mechanical or electrical mechanism (not shown) as maintaining the lifted condition of the magnetic head 46 above the disk 10 by means of the magnetic head lifters 58. Then, the eject arm 86 is pivotally moved in the counterclockwise direction as viewed in FIG. 6 by the biasing force of the torsion coil spring 88, thereby ejecting the magneto-optical disk cartridge 8 from the magneto-optical disk drive 2A. At this time, the roller 82 is returned to its initial position shown in FIG. 5 by the cartridge eject spring 90. Further, the shutter 68 of the cartridge 8 is closed by the shutter spring 76.

This preferred embodiment is characterized in one aspect in that the optical head 28 and the magnetic head 46 are driven independently of each other. Furthermore, the magneto-optical disk drive 2A is provided with means for lifting and retaining the magnetic head 46 above the disk 10 at an innermost circumferential portion thereof. Accordingly, as shown in FIG. 1, the stroke S2 of movement of the magnetic head 46 is set longer than the stroke S1 of movement of the optical head 28 on the inner circumferential side of the disk 10.

The movable range of the second carriage 42 is limited by the stoppers 60 and 64. The magnetic head 46 can seek to a position radially inside of the movable range of the optical head 28 until the second carriage 42 comes to abutment against the stopper 60. When the magnetic head 46 seeks to such an inner circumferential position beyond the movable range of the optical head 28, the engaging member 48 is gradually lifted by the inclined surface 58a of each magnetic head lifter 58, and then retained by the horizontal surface 58b of each magnetic head lifter 58 to thereby hold the magnetic head 46 in the lifted condition above the disk 10.

Referring back to FIG. 1, reference character L denotes a distance between the rear end of the second carriage 42 when it is moved to the outermost circumferential side (the outer limited position defined by the stopper 64) and the front end of the magnetic head 46 when the second carriage 42 is moved to the innermost circumferential side (the inner limited position defined by the stopper 60). This distance L can be reduced over the corresponding distance in the conventional configuration where an optical head and a magnetic head are mounted on the same carriage.

Further, reference numerals 92A and 92B shown in FIG. 1 denote a space for installing optical components. Since the optical head 28 and the magnetic head 46 are driven independently of each other in this preferred embodiment, the installation space for optical components can be made larger by the hatched area 92B than that of the conventional disk drive. As a result, the magneto-optical disk drive 2A in this preferred embodiment can be reduced in planar size and thickness.

Figure 8:
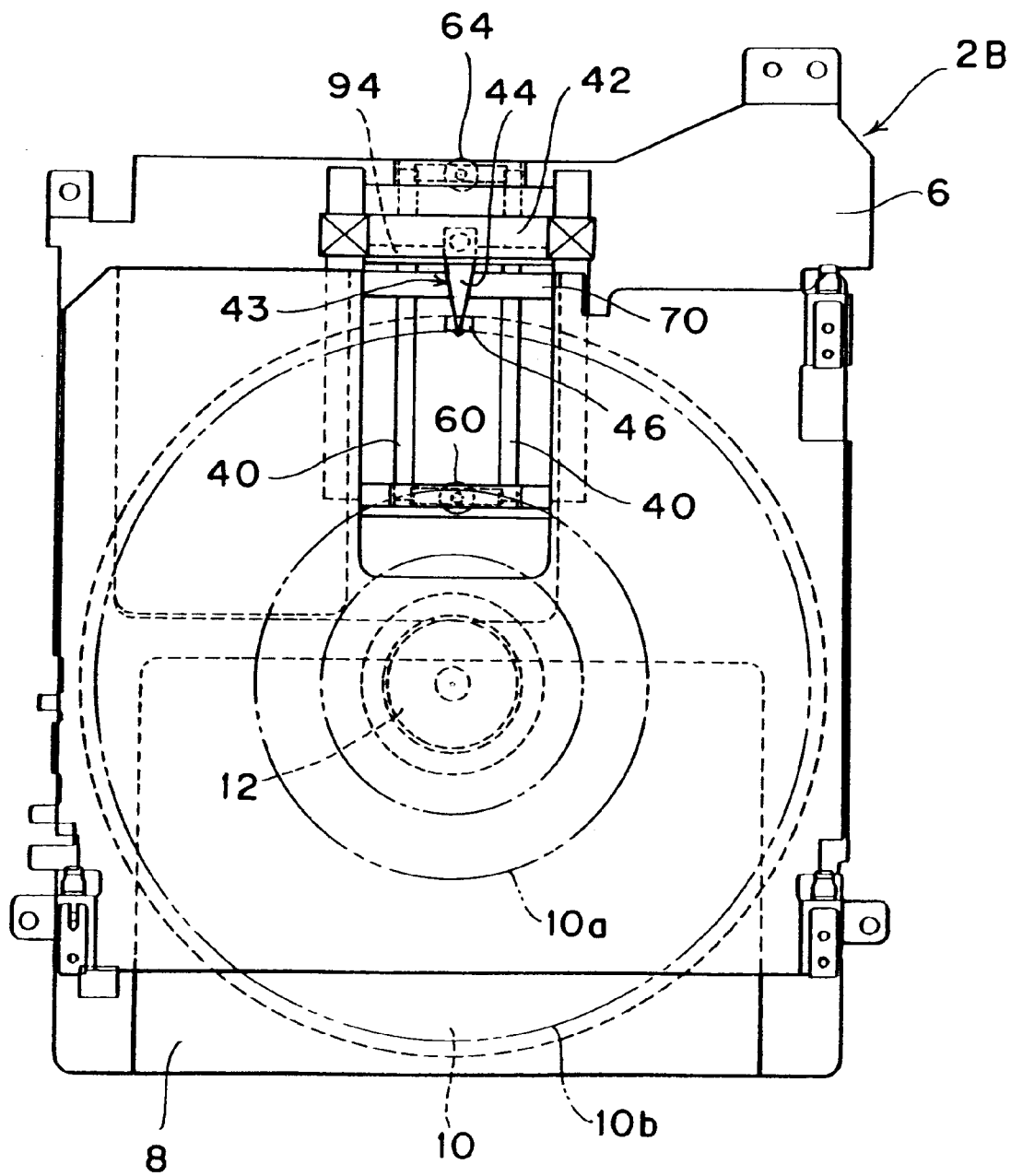
FIG. 8 is a schematic plan view of a magneto-optical disk drive according to a second preferred embodiment of the present invention with a drive mechanism for an optical head being omitted.
Figure 9A:
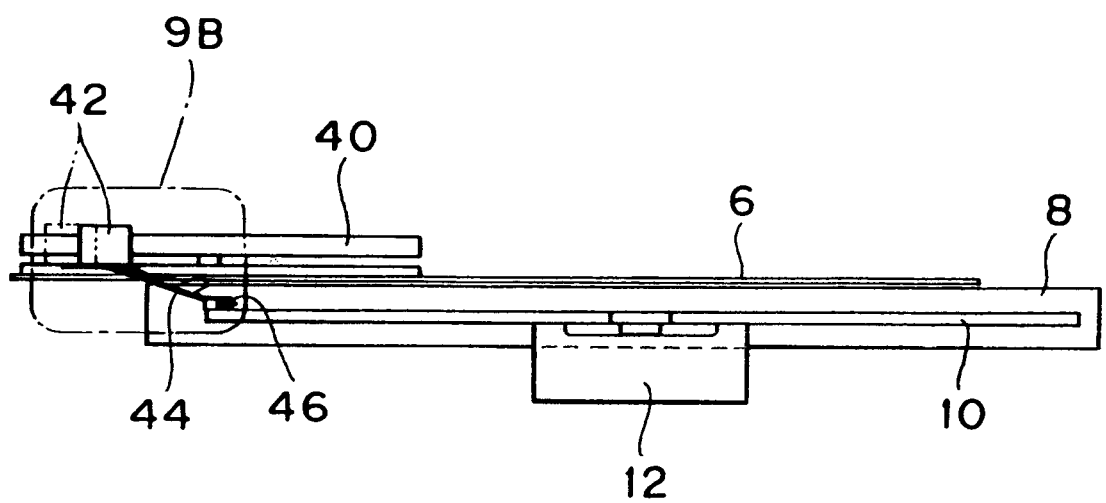
FIG. 9A is a schematic side view of FIG. 8.
Figure 10:
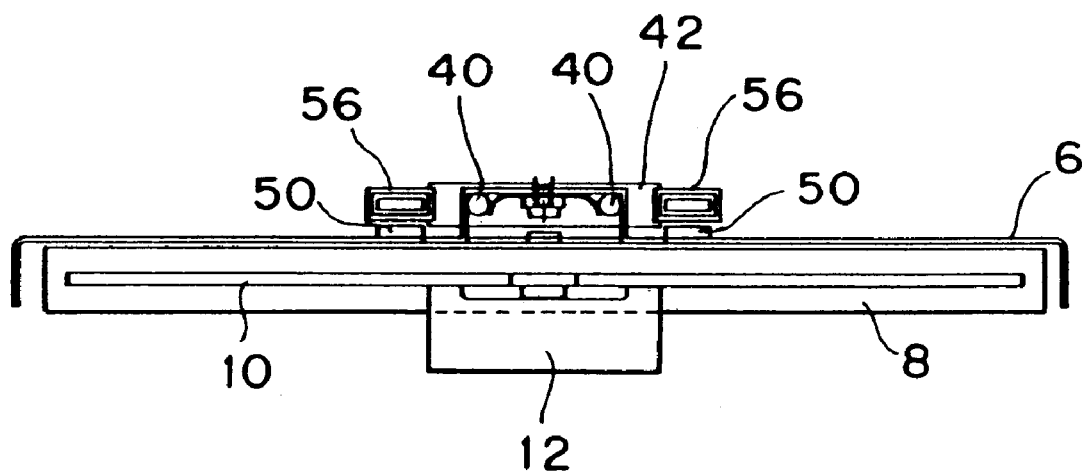
FIG. 10 is a schematic rear elevation of FIG. 8.

Referring to FIG. 8, there is shown a schematic plan view of a magneto-optical disk drive 2B according to a second preferred embodiment of the present invention. In FIG. 8, omitted parts are similar to those in FIG. 1. FIG. 9A is a left side view of FIG. 8, and FIG. 10 is a rear elevation of FIG. 8. In the second preferred embodiment, the magnetic head 46 can seek to an outer circumferential position beyond the movable range of the optical head 28, and the magnetic head 46 is held in the lifted condition above the magneto-optical disk 10 at such a position radially outside of the data region of the disk 10.

Figure 9B:
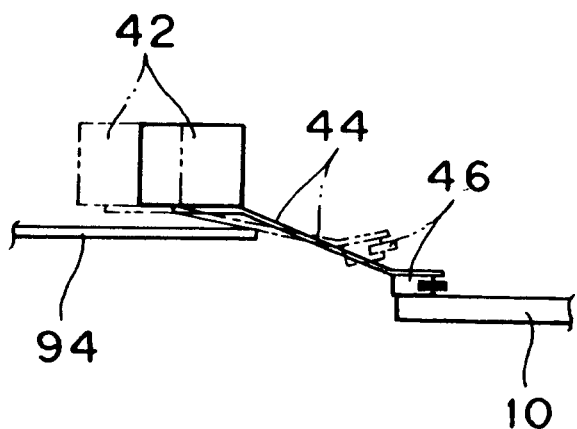
FIG. 9B is an enlarged view of a portion 9B shown in FIG. 9A.
Figure 11:
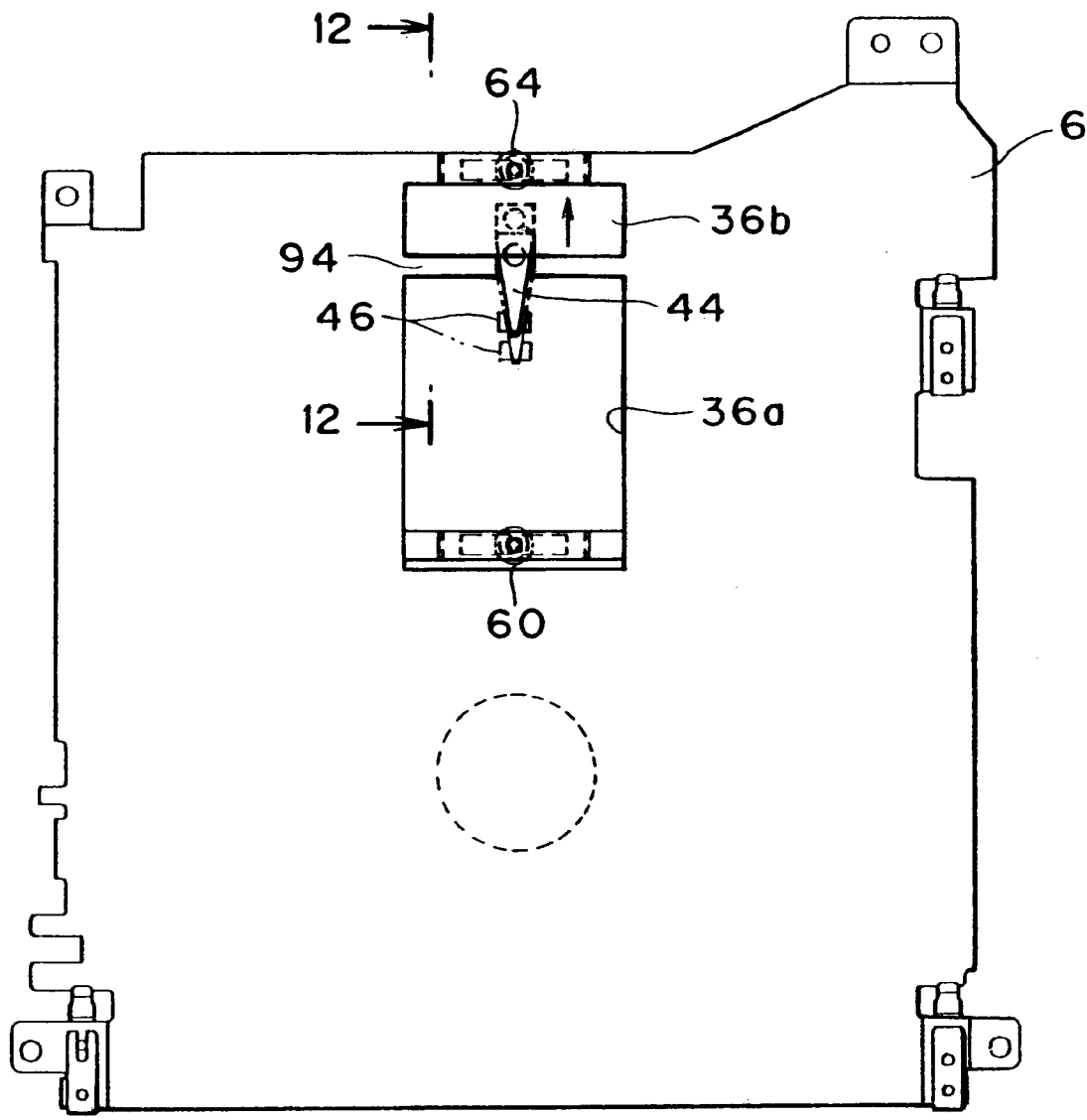
FIG. 11 is a plan view showing the relation between a cartridge holder and a magnetic head assembly in the second preferred embodiment.
Figure 12:
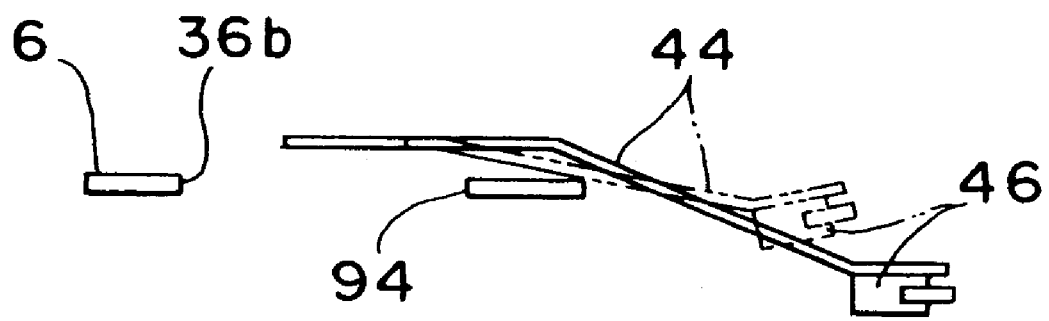
FIG. 12 is a cross section taken along the line 12—12 in FIG. 11.

As shown in FIG. 11, the cartridge holder 6 is formed with two rectangular openings 36a and 36b. A portion 94 of the cartridge holder 6 between the two openings 36a and 36b is used as a magnetic head lifter. When the magnetic head 46 seeks to the outer circumferential position beyond the movable range of the optical head 28 in inserting/ejecting the cartridge 8, in reproducing data, or during standby, the load beam 44 is gradually lifted by the magnetic head lifter portion 94 of the cartridge holder 6, and the magnetic head 46 is accordingly held in the lifted condition above the disk 10 as shown in FIG. 9B and FIG. 12.

In this preferred embodiment, the magnetic head lifter portion 94 is formed at a position deeper than that of the front end of the cartridge 8 fully inserted in the disk drive 2B. Accordingly, there is no possibility of collision between the cartridge 8 and the magnetic head lifter portion 94 during insertion of the cartridge 8. The other configuration of the second preferred embodiment is similar to that of the first preferred embodiment, so the description thereof will be omitted herein.

Figure 13:
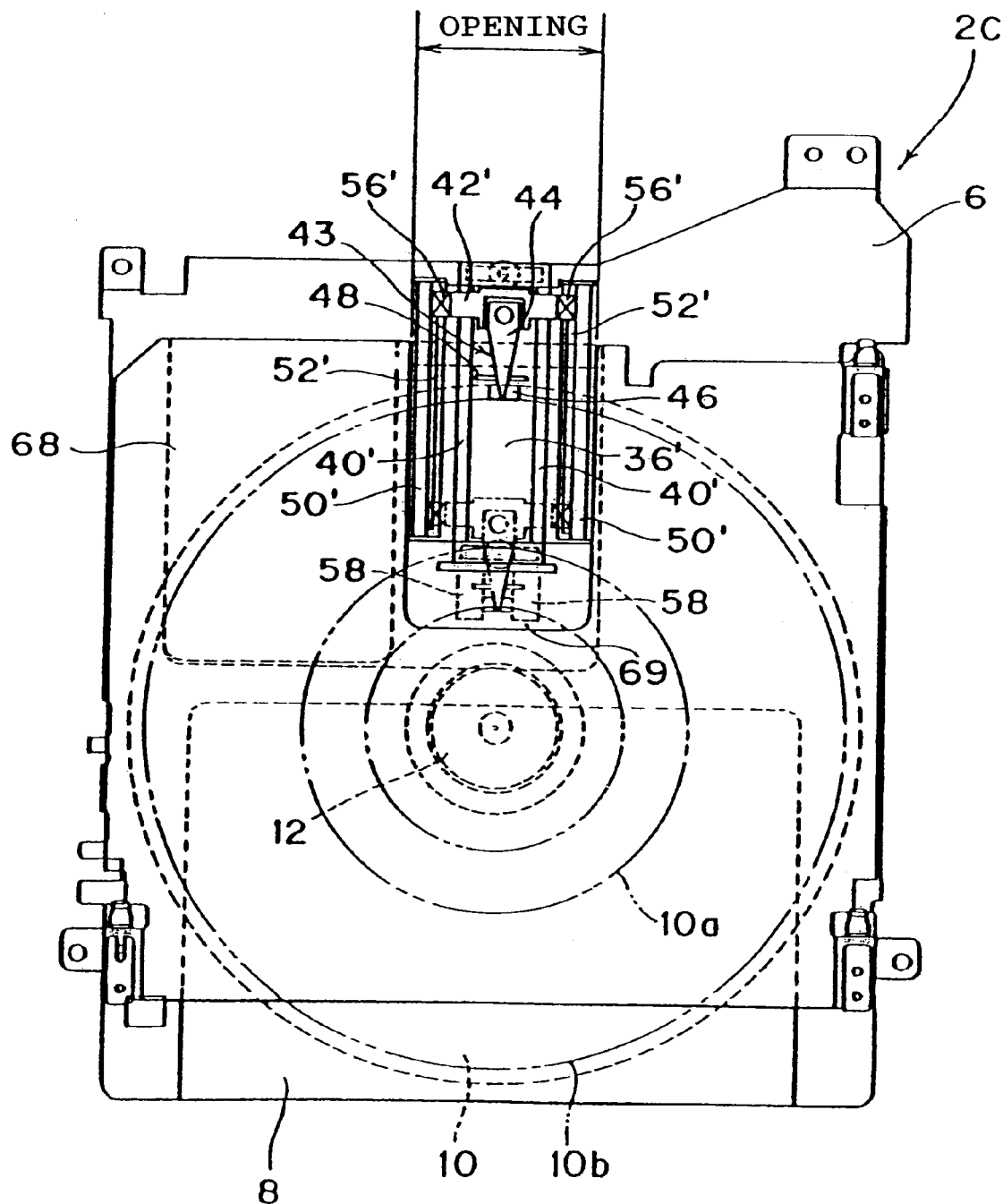
FIG. 13 is a schematic plan view of a magneto-optical disk drive according to a third preferred embodiment of the present invention with a drive mechanism for an optical head being omitted.
Figure 14:
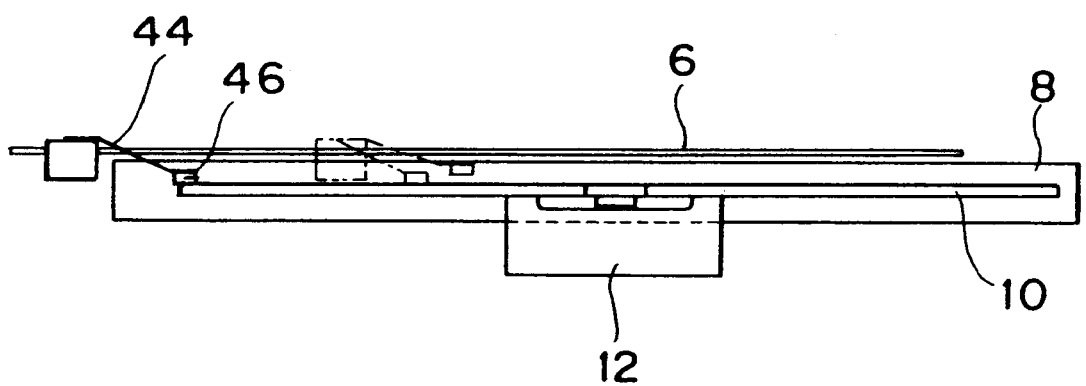
FIG. 14 is a schematic side view of FIG. 13.

Referring to FIG. 13, there is shown a schematic plan view of a magneto-optical disk drive 2C according to a third preferred embodiment of the present invention. In FIG. 13, omitted parts are similar to those in FIG. 1. The third preferred embodiment is similar to the first preferred embodiment shown in FIG. 1 with the exception that a voice coil motor (VCM) for driving a second carriage 42' is made compact so as to fall inside the window (opening) 69 of the cartridge 8.

Figure 15A:
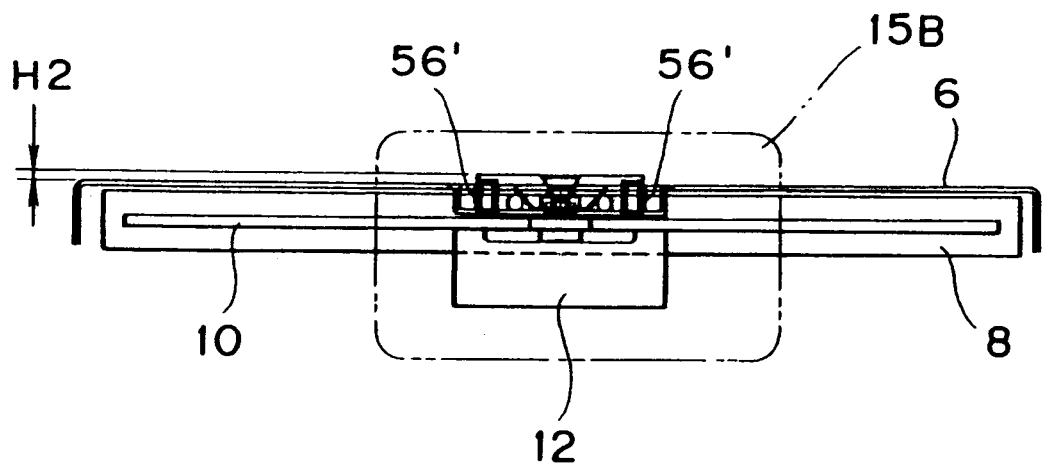
FIG. 15A is a schematic rear elevation of FIG. 13.
Figure 15B:
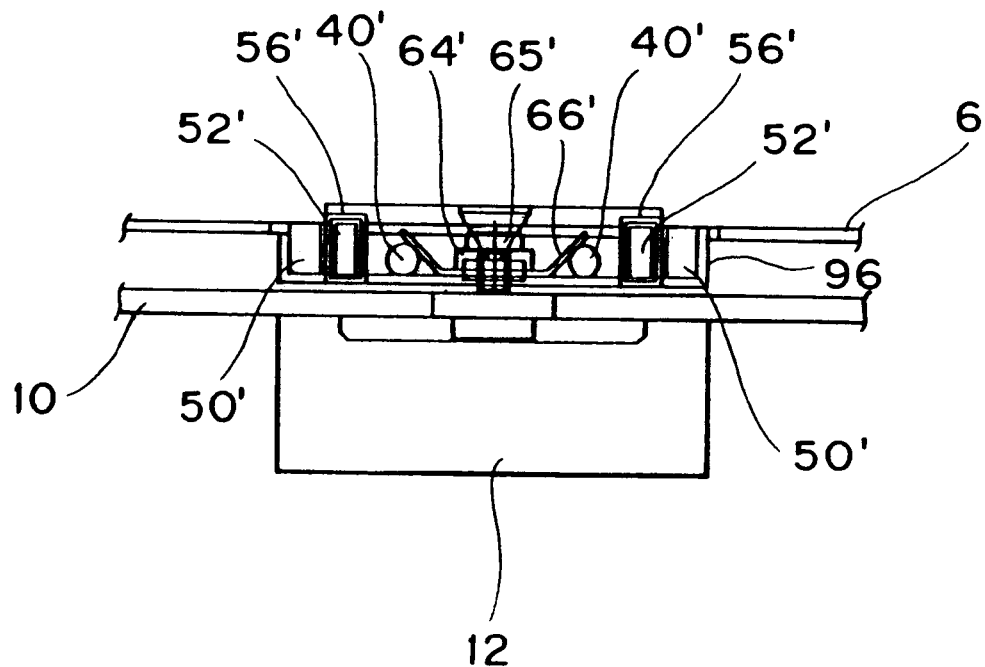
FIG. 15B is an enlarged view of a portion 15B shown in FIG. 15A.

Substantially the same parts as those of the first preferred embodiment are denoted by the same reference numerals with primes (') added. As best shown in FIG. 15B, the cartridge holder 6 is integrally formed with a recessed portion 96. This recessed portion 96 defines an opening 36' as shown in FIG. 13. A pair of guide rails 40' are fixed to the recessed portion 96 of the cartridge holder 6 by securing a stopper 64' and a leaf spring 66' to the recessed portion 96 by means of a screw 65'. The cartridge holder 6 is formed of a magnetic material such as iron, so that a pair of permanent magnets 50' are magnetically attached to the opposite side walls of the recessed portion 96.

A pair of top yokes 52' are respectively provided aside the pair of permanent magnets 50'. Each top yoke 52' is bent at its opposite ends and magnetically attached to the corresponding permanent magnet 50'. Each side wall of the recessed portion 96 forms a back yoke. Thus, the back yokes 96, the permanent magnets 50', and the top yokes 52' constitute a pair of magnetic circuits. A magnetic head assembly 43 is fixed to the second carriage 42'. The second carriage 42' has a pair of coils 56' at positions corresponding to the pair of magnetic circuits. The magnetic circuits and the coils 56' constitute a voice coil motor (VCM). By passing a current through the coils 56', the second carriage 42' is moved in the radial direction of the disk 10 as being guided by the pair of guide rails 40'.

The operation of the third preferred embodiment is similar to that of the first preferred embodiment. That is, when the magnetic head 46 seeks to an inner circumferential position beyond the movable range of the optical head 28, the engaging member 48 is gradually lifted by the inclined surface 58a of each magnetic head lifter 58, and then retained by the horizontal surface 58b of each magnetic head lifter 58 to thereby hold the magnetic head 46 in the lifted condition above the disk 10.

According to this preferred embodiment, the drive means (VCM) for the magnetic head assembly 43 is configured so as to fall within the window (opening) 69 of the cartridge 8. Accordingly, a vertical space H2 (see FIG. 15A) occupied by the VCM for the magnetic head 46 above the cartridge holder 6 can be reduced over a vertical space H1 (see FIG. 3) in the first preferred embodiment, thereby realizing a magneto-optical disk drive having a smaller size.

Figure 16:
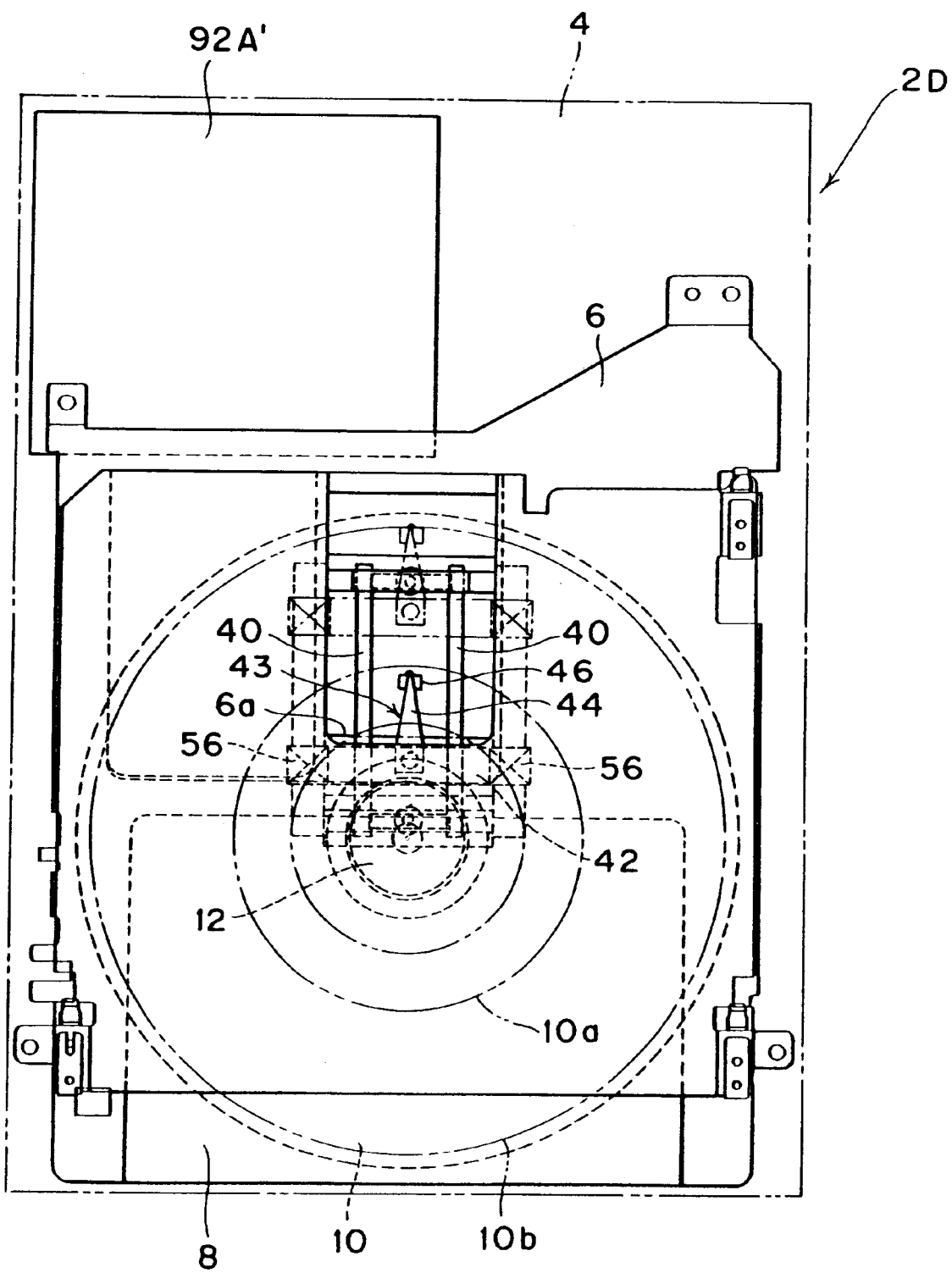
FIG. 16 is a schematic plan view of a magneto-optical disk drive according to a fourth preferred embodiment of the present invention with a drive mechanism for an optical head being omitted.

Referring to FIG. 16, there is shown a schematic plan view of a magneto-optical disk drive 2D according to a fourth preferred embodiment of the present invention. In FIG. 16, omitted parts are similar to those in FIG. 1. This preferred embodiment is configured by 180° rotating the magnetic head assembly 43 shown in FIG. 1 and mounting it on the second carriage 42.

That is, the magnetic head assembly 43 is mounted on the second carriage 42 so that the magnetic head 46 is positioned on the outer circumferential side of the disk 10 and the fixed portion of the load beam 44 to the second carriage 42 is positioned on the inner circumferential side of the disk 10. With this configuration, the magnetic head assembly 43 is not projected outside from the outermost circumference of the disk 10, so that a wider space 92A' for installation of optical components and circuit components can be ensured.

Figure 17A:
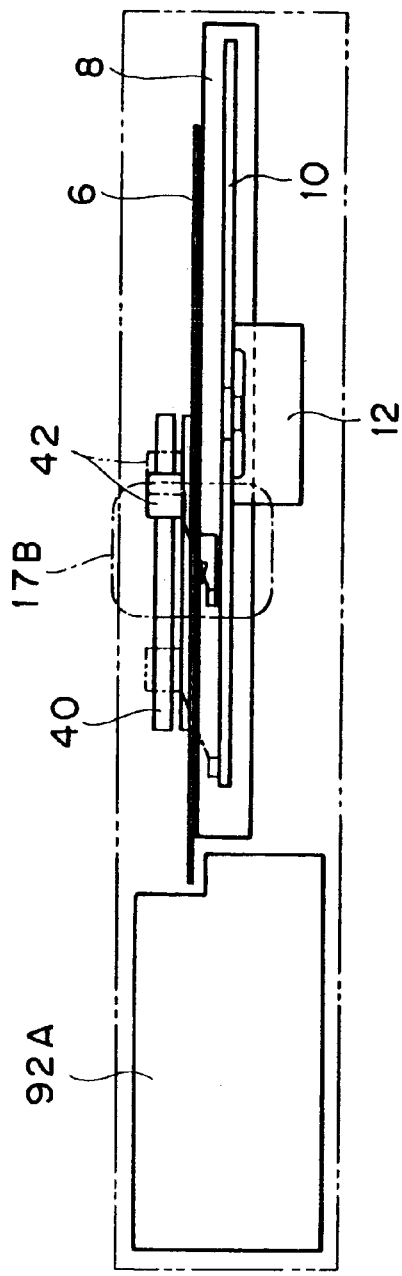
FIG. 17A is a schematic side view of FIG. 16.
Figure 17B:
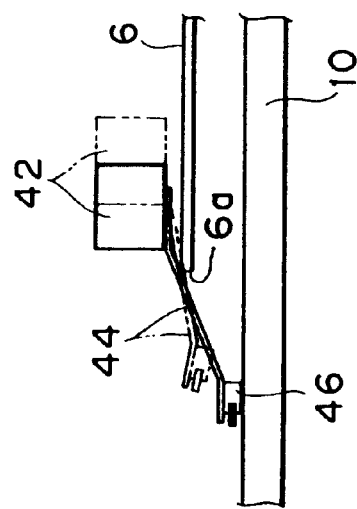
FIG. 17B is an enlarged view of a portion 17B shown in FIG. 17A.
Figure 18:
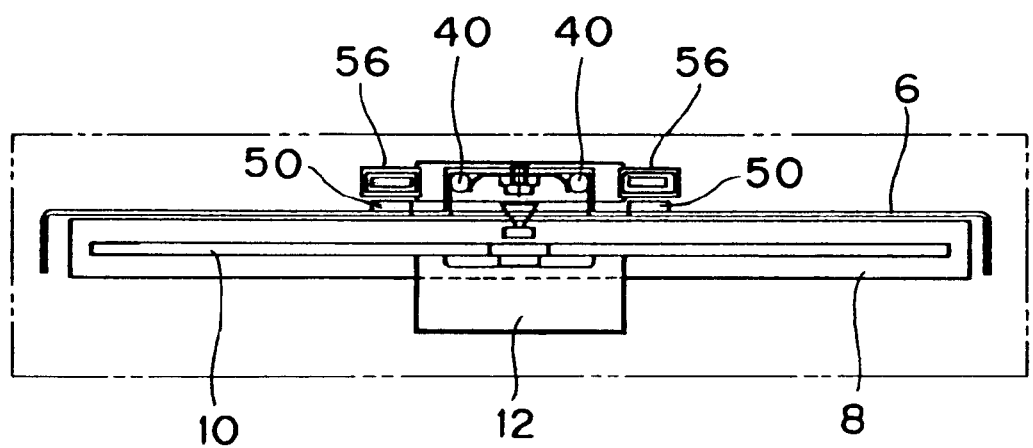
FIG. 18 is a schematic rear elevation of FIG. 16.

When the magnetic head 46 seeks to an inner circumferential position of the disk 10 beyond the movable range of the optical head 28, the load beam 44 rides on an edge 6a of the cartridge holder 6 defining an opening as shown in FIGS. 17A and 17B, and the magnetic head 46 is accordingly held in the lifted condition above the disk 10. Accordingly, this preferred embodiment can eliminate the engaging member 48 shown in FIG. 1.

Figure 19:
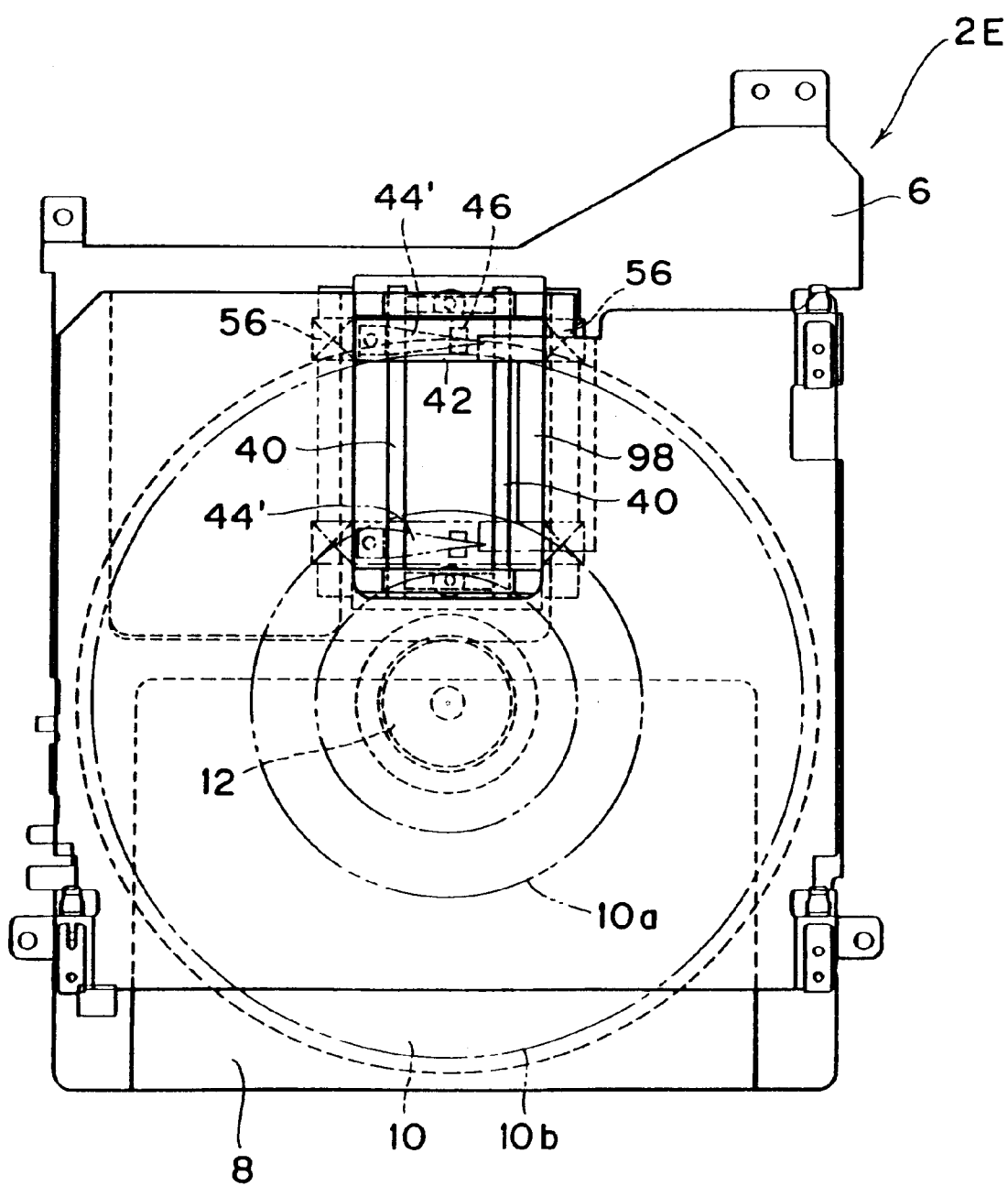
FIG. 19 is a schematic plan view of a magneto-optical disk drive according to a fifth preferred embodiment of the present invention with a drive mechanism for an optical head being omitted.
Figure 20:
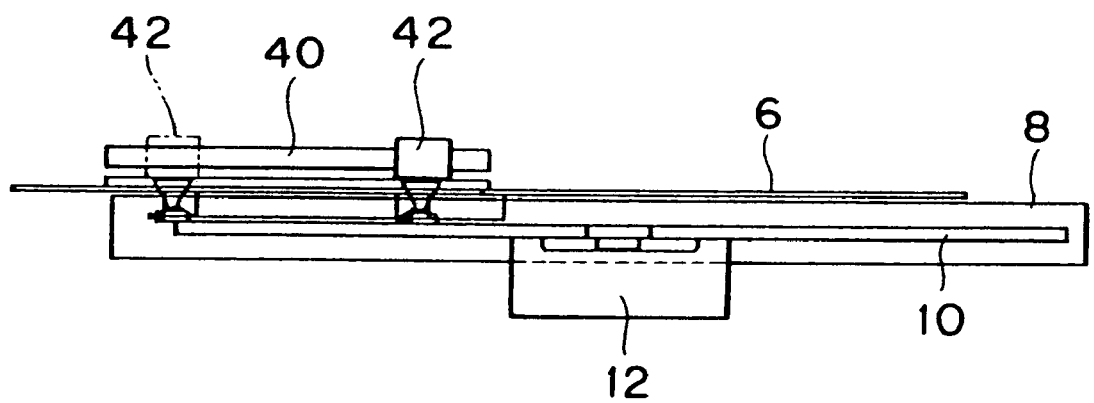
FIG. 20 is a schematic side view of FIG. 19.
Figure 21:
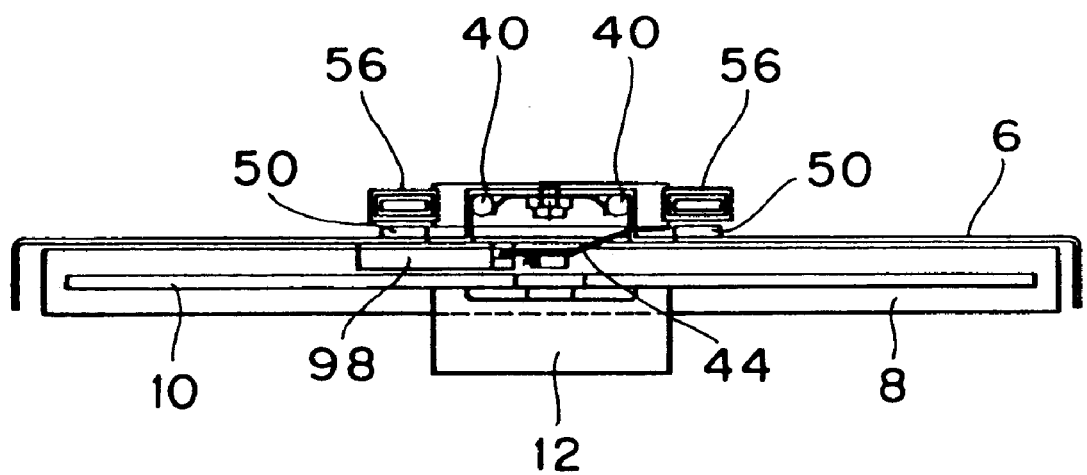
FIG. 21 is a schematic rear elevation of FIG. 19.

Referring to FIG. 19, there is shown a schematic plan view of a magneto-optical disk drive 2E according to a fifth preferred embodiment of the present invention. In FIG. 19, omitted parts are similar to those in FIG. 1. In this preferred embodiment, a load beam 44' is mounted on the second carriage 42 in such a manner that the longitudinal direction of the load beam 44' is perpendicular to the direction of movement of the second carriage 42.

As shown in FIG. 22, the load beam 44' has a front end portion 44a extending beyond the magnetic head 46. The front end portion 44a corresponds to the engaging member 48 in the first preferred embodiment. A magnetic head lifter 98 is fixed to the lower surface of the cartridge holder 6. The magnetic head lifter 98 is formed with a pair of inclined surfaces 98a at positions corresponding to the inner circumferential position and the outer circumferential position of the disk 10 inserted in the disk drive 2E.

When the magnetic head 46 seeks to the inner or outer circumferential position of the disk 10 beyond the movable range of the optical head 28, the front end portion 44a of the load beam 44' is gradually lifted by one of the inclined surfaces 98a of the magnetic head lifter 98, so that the magnetic head 46 is held in the lifted condition above the disk 10. Thus, the magnetic head 46 can be held in the lifted condition at any one of the inner circumferential position and the outer circumferential position of the disk 10 in this preferred embodiment.

Referring to FIG. 23, there is shown a timing chart in the present invention. FIG. 24 shows a timing chart in the prior art for comparison. The operations of the spindle motor and the optical head in the present invention are similar to those in the prior art. That is, the spindle motor is in rotation during data reading, data writing, and idling. The tracking of the optical head is on during data reading and data writing, and is off during idling.

As apparent from FIG. 23, the tracking of the magnetic head in the present invention is on only during data writing. Accordingly, during cartridge insertion, cartridge ejection, data reading, idling, and sleeping, the magnetic head is held in the lifted condition above the disk. Further, in the present invention, the loading of the magnetic head is performed always during rotation of the disk, so that there is no possibility of contact of the magnetic head and the disk. This type of loading is referred to as dynamic loading.

In the prior art shown in FIG. 24, the magnetic head is held in the lifted condition above the disk by mechanical means only during cartridge insertion and cartridge ejection. More specifically, (A) shows a condition where coils for driving the carriage are not energized, but the spindle motor is in rotation to give a positive pressure from the rotating disk to the magnetic head, thereby flying the magnetic head. (B) shows a condition where the rotation of the spindle motor is stopped and the magnetic head comes into contact with the disk surface. (C) shows a condition where the magnetic head is sufficiently lifted above the disk surface by the mechanical means.

As apparent from the above description, the present invention can eliminate the risky conditions (A) and (B) mentioned above in the prior art, thereby improving the reliability of the magneto-optical disk drive.

Having thus described specific preferred embodiments of the present invention applied to an optical disk drive having a flying type magnetic head, the present invention is not limited to the above preferred embodiments, but it is applicable also to an optical disk drive having a contact type magnetic head. Further, there is a large chance that an optical disk drive adopting an optical modulation method may include a magnetic head with the advance of high-density recording and reproduction. Accordingly, the present invention is applicable also to such an optical modulation type optical disk drive using a magnetic head.

According to the present invention, the optical disk drive is provided with means for holding the magnetic head in the lifted condition above the disk surface at a position outside the data region of the disk at all times except when operating the magnetic head. Accordingly, the risk of breakage of the magnetic head when the disk is present in the disk drive can be reduced to thereby improve the reliability.

Further, the second carriage on which the magnetic head is mounted is located on the cartridge holder. Accordingly, it is not necessary to increase the thickness of the cartridge holder to ensure a space for installation of the drive mechanism for the magnetic head, but the drive mechanism for the magnetic head can be installed on the cartridge holder or in a free space below the cartridge holder, thereby reducing the thickness of the disk drive.

Further, the mechanism for moving the optical head and the mechanism for moving the magnetic head are separated from each other. Accordingly, it is not necessary to retract the carriage on which the magnetic head is mounted toward the rear side of the disk drive, so that an installation space for optical components can be sufficiently ensured to thereby allow a size reduction of the disk drive.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical storage device for making an access to an optical storage medium, comprising:

a drive base;

a first carriage mounted on said drive base so as to be reciprocatable in a first direction;

a first drive mechanism for moving said first carriage;

an optical head mounted on said first carriage for directing light to a given position on said optical storage medium;

a second carriage provided independently of said first carriage so as to be reciprocatable in said first direction;

a second drive mechanism for moving said second carriage; and a magnetic head assembly mounted on said second carriage and having a magnetic head for applying a magnetic field to a given position on said optical storage medium;

wherein the stroke of movement of said magnetic head is longer than the stroke of movement of said optical head.

2. An optical storage device according to claim 1, wherein the stroke of movement of said magnetic head is longer than the stroke of movement of said optical head on the inner circumferential side of said optical storage medium.

3. An optical storage device according to claim 1, wherein the stroke of movement of said magnetic head is longer than the stroke of movement of said optical head on the outer circumferential side of said optical storage medium.

4. An optical storage device according to claim 1, further comprising a cartridge holder provided on said drive base for receiving said optical storage medium;

wherein said second carriage is mounted on said cartridge holder.

5. An optical storage device according to claim 4, further comprising an unloading mechanism for unloading said magnetic head with respect to said optical storage medium when said magnetic head is moved to an outer circumferential portion or an inner circumferential portion of said optical storage medium.

6. An optical storage device according to claim 5, wherein:

said magnetic head assembly comprises a support member fixed at a base end portion thereof to said second carriage and said magnetic head mounted on a front end portion of said support member; and said unloading mechanism comprises a magnetic head lifter fixed to said cartridge holder for engaging said support member so as to move said magnetic head away from said optical storage medium.

* * * * *